(12) United States Patent
De Angelis et al.

(10) Patent No.: US 8,240,170 B2
(45) Date of Patent: Aug. 14, 2012

(54) APPARATUS FOR SEALING A JOINT BETWEEN VESSELS FOR CONVEYING MOLTEN GLASS

(75) Inventors: Gilbert De Angelis, Lindley, NY (US); Ronald L. Kimball, Corning, NY (US)

(73) Assignee: Corning Incorporated, Corning, NY (US)

( * ) Notice: Subject to any disclaimer, the term of this patent is extended or adjusted under 35 U.S.C. 154(b) by 259 days.

(21) Appl. No.: 12/709,766

(22) Filed: Feb. 22, 2010

(65) Prior Publication Data

US 2011/0203321 A1    Aug. 25, 2011

(51) Int. Cl.
*C03B 15/02* (2006.01)
*C03B 17/06* (2006.01)
*C03B 5/26* (2006.01)

(52) U.S. Cl. ............ 65/157; 65/195; 65/324; 65/325; 65/53; 65/99.1; 65/126

(58) Field of Classification Search ......... 65/45, 53, 65/90, 98, 99.1, 121, 126, 157, 195, 325, 65/324

See application file for complete search history.

(56) References Cited

U.S. PATENT DOCUMENTS

| | | | | |
|---|---|---|---|---|
| 4,980,091 A * | 12/1990 | Joutel | .............. | 588/11 |
| 5,820,652 A * | 10/1998 | Bernard et al. | .............. | 65/325 |
| 5,851,258 A * | 12/1998 | Ando et al. | .............. | 65/329 |
| 6,119,484 A * | 9/2000 | Takei et al. | .............. | 65/134.2 |
| 6,286,337 B1 * | 9/2001 | Palmquist | .............. | 65/157 |
| 6,321,572 B1 * | 11/2001 | Takei et al. | .............. | 65/157 |
| 6,405,564 B1 * | 6/2002 | Takei et al. | .............. | 65/157 |
| 6,889,526 B2 | 5/2005 | Pitbladdo | .............. | 65/53 |
| 6,895,782 B2 | 5/2005 | Pitbladdo | .............. | 65/53 |
| 7,032,412 B2 | 4/2006 | Dorfeld et al. | .............. | 65/53 |
| 7,155,935 B2 | 1/2007 | Pitbladdo | .............. | 65/53 |
| 7,380,416 B2 * | 6/2008 | Tomita et al. | .............. | 65/134.2 |
| 7,628,038 B2 | 12/2009 | DeAngelis et al. | .............. | 65/134.1 |
| 7,628,039 B2 | 12/2009 | DeAngelis et al. | .............. | 65/157 |
| 7,681,414 B2 * | 3/2010 | Pitbladdo | .............. | 65/193 |
| 7,762,105 B2 * | 7/2010 | Takeshita et al. | .............. | 65/134.2 |
| 8,006,517 B2 * | 8/2011 | Pitbladdo | .............. | 65/99.1 |
| 8,065,892 B2 | 11/2011 | Kano | .............. | 65/324 |
| 2004/0177649 A1 | 9/2004 | Dorfeld et al. | .............. | 65/90 |
| 2005/0092027 A1 | 5/2005 | Pitbladdo | .............. | 65/195 |
| 2005/0268663 A1 * | 12/2005 | Tomita et al. | .............. | 65/374.12 |
| 2006/0016219 A1 | 1/2006 | Pitbladdo | .............. | 65/29.21 |
| 2006/0236722 A1 | 10/2006 | Delia et al. | .............. | 65/90 |
| 2006/0242995 A1 | 11/2006 | Bookbinder et al. | .............. | 65/134.1 |
| 2006/0242996 A1 | 11/2006 | DeAngelis et al. | .............. | 65/134.1 |
| 2007/0068197 A1 * | 3/2007 | Pitbladdo | .............. | 65/90 |
| 2008/0034798 A1 * | 2/2008 | Bergman et al. | .............. | 65/90 |
| 2008/0120997 A1 * | 5/2008 | Takeshita et al. | .............. | 65/134.2 |
| 2009/0000335 A1 | 1/2009 | Urata et al. | .............. | 65/134.2 |
| 2009/0126405 A1 | 5/2009 | DeAngelis et al. | .............. | 65/32.5 |
| 2009/0217708 A1 | 9/2009 | DeAngelis et al. | .............. | 65/134.2 |
| 2009/0241602 A1 | 10/2009 | DeAngelis et al. | .............. | 65/32.5 |
| 2010/0139321 A1 * | 6/2010 | Pitbladdo | .............. | 65/29.14 |

* cited by examiner

*Primary Examiner* — Jason L. Lazorcik
(74) *Attorney, Agent, or Firm* — Kevin M. Able

(57) ABSTRACT

A sealing apparatus for use in conveying molten glass from a first vessel to a second vessel, wherein at least a portion of the first vessel is nested within the second vessel without contact between the first and second vessels, and a flexible member comprising a gas-tight seal separates an atmosphere enclosed by the sealing apparatus and an ambient atmosphere. The sealing apparatus is useful for flexibly sealing a non-contact joint between conduits for supplying molten glass to a forming body.

12 Claims, 3 Drawing Sheets

APPARATUS FOR SEALING A JOINT BETWEEN VESSELS FOR CONVEYING MOLTEN GLASS

TECHNICAL FIELD

This invention is directed to an apparatus and method of controlling the environment disposed about a transition joint between two vessels for conveying molten glass, and particularly an expansion joint between two non-contacting conduits.

BACKGROUND

One method of forming a thin sheet of glass is by a drawing process where a ribbon of glass is drawn from a reservoir of molten glass. This may be accomplished, for example, via a down-draw process (e.g. slot or fusion), where the ribbon is drawn downward, typically from a forming body. Once the ribbon is formed, individual sheets of glass are cut from the ribbon.

In a conventional downdraw process, the molten glass is formed by melting precursor, or batch materials in a melting furnace. The molten glass is then flowed through various other components, such as fining vessels and stirring vessels. Eventually, the molten glass is conveyed to the forming body where the molten glass is formed into a continuous ribbon of glass. The ribbon may thereafter be separated into individual panes or glass sheets. The transfer apparatus for molten glass from the upstream portions of the conveying system to the forming body is particularly important, and must be capable of balancing many needs, such as the thermal expansion of the different materials of the system. For example, in the case of a fusion-type downdraw process, the forming body is typically a refractory material (e.g. a ceramic), that has a different thermal expansion characteristic than the principally platinum or platinum alloy vessels preceding it. To that end, the connection between the preceding system and the forming body inlet are typically free-floating, in the sense that the inlet conduit and the feed conduit are not directly joined, but instead ride one within the other without direct contact. Nevertheless, there is a need to provide a seal between the feed and inlet conduits.

SUMMARY

In a delivery system for conveying molten glass to a forming apparatus to produce high purity glass articles, such as glass for optical components (e.g. optical lenses) and liquid crystal display substrates, the vessels used to convey the molten glass are often formed from a oxidation resistant metal capable of withstanding prolonged exposure to very high temperatures, sometimes in excess of 1600° C. Certain platinum group metals are ideal for such applications, particular platinum group metals such as platinum, rhodium, and alloys thereof (e.g. alloys containing from 70%-80% platinum and 30%-20% rhodium). Since the delivery system is formed of metal vessels (e.g. conduits), the delivery system is typically rigidly connected and supported, and even small displacement can cause damage to the vessels and/or disruption to the forming process. This is particularly true in the case of vessels comprising platinum, since the high cost of the metal drives the need to make the vessels as thin as possible.

Unfortunately, certain components of the delivery and/or forming apparatus must be capable of movement. For example, certain components of the delivery and/or forming apparatus may be comprised of different materials with different thermal expansion characteristics. During heat up or cool down of the system or apparatus, the differential expansion can result in relative movement of the components that must be accommodated. In addition, one or more of the components may be intentionally moved. For example, in a fusion-type process for forming glass sheets, the molten glass is flowed over exterior forming surfaces of a forming body. The forming body may, from time to time, be tilted to adjust the mass flow rate over the forming body. Thus, the delivery system must be capable of accommodating this motion without damage to the system components.

To provide a flexible non-contact joint between portions of the delivery system and/or forming apparatus, it has been the practice to nest at least a portion of one vessel inside another vessel in a manner such that the first vessel does not contact the second vessel. For example, the end of a first conduit (pipe) may be inserted into the opening of another downstream conduit (pipe), wherein a gap separates the first and second conduits, and the molten glass is flowed from the first conduit into the second conduit. However, the gap provides a free surface to the molten glass that is exposed to the ambient atmosphere. Because of the large temperature differentials associated with the delivery system and surrounding apparatus, thermally induced drafts can cause the formation of gaseous inclusions (blisters) in the molten glass that are then transported to the forming apparatus and incorporated into the formed glass article.

As described herein, a flexible barrier is proposed that forms a gas tight seal around the vessel-to-vessel non-contact joint and isolates the atmosphere to which the molten glass free surface is exposed). The flexible barrier allows movement of one vessel of the joint without influencing the position of the other vessel of the joint, and facilitates conditioning of the atmosphere in contact with the molten glass free surface independently from the ambient atmosphere.

In accordance with one embodiment, an apparatus for sealing a gap between vessels conveying molten glass comprises a first conduit having an open distal end and a second conduit having an open distal end. At least a first portion of the first conduit adjacent the first conduit distal end is disposed within the second conduit without contacting the second conduit. A gap is disposed between the first conduit and the second conduit that exposes a free surface of the molten glass in the second conduit to a first atmosphere. The apparatus further comprises a flexible barrier disposed about a second portion of the first conduit, wherein the second portion extends from the second conduit open distal end. A first sealing flange is joined to the first conduit and a second sealing flange is joined to the second conduit. The flexible barrier, the first sealing flange and second sealing flange comprise a gas-tight seal that separates the first atmosphere from an ambient atmosphere disposed about an exterior of the flexible barrier. The flexible barrier may be, for example, a bellows.

In some embodiments, the first and second flanges each comprise an inner ring and an outer ring joined to the respective inner ring. That is, the outer ring is joined about a periphery of the inner ring. The outer ring and the inner ring may, for example, be welded together. In certain embodiment the inner ring of both the first conduit and the second conduit flanges comprises platinum. The inner ring may be a platinum alloy, such as a platinum rhodium alloy. The first and second conduits may also comprise platinum.

To prevent the generation of galvanic electrical currents, the flexible barrier is electrically isolated from the first and second conduits. Moreover, the inner ring of the either or both of the first or second flanges is non-planar, having instead an undulation (deviation from planarity) that accommodates movement of the respective associated conduit by flexing of the respective flange.

Preferably, the first atmosphere in contact with the molten glass free surface is different than the second atmosphere. For example, the apparatus may include a control system for varying a hydrogen partial pressure of the first atmosphere.

The flexible barrier is preferably formed from a material capable of withstanding exposure to temperatures in excess of 500° C. for at least two months without significant deterioration. For example, a suitable material for the flexible barrier is stainless steel comprising nickel or chromium. In some instances, for example if either the first or second conduits is directly heated by flowing an electrical current through one or both of the conduits, is preferable that the flexible barrier is non-magnetic to prevent the generation of electrical eddy current.

To prevent the flow of galvanic currents between the conduits and subsequent generation of oxygen bubbles within the molten glass, the first and/or second conduit is electrically isolated from electrical ground.

In another embodiment, a method of making a glass article is described comprising producing a molten glass and conveying the molten glass from a first vessel to a second vessel. The glass article may be, for example, a glass ribbon that can then be separated into individual glass sheets. At least a portion of the first vessel extends within the second vessel without contact with the second vessel, there being a free surface of the molten glass exposed to a first atmosphere in a gap between the first and second vessels. The first atmosphere is separated from an ambient atmosphere by a flexible metallic barrier coupled to the first and second vessels. The flexible barrier comprises a gas tight seal between the first and ambient atmospheres. The molten glass is flowed from the second vessel to a forming body to produce a glass article. The flexible barrier may, for example, comprise a bellows. The bellows includes pleats that allow for both expansion and contraction of the bellows. The flexible barrier is preferably electrically isolated from the first and second vessels to eliminate galvanic current flow between the first and second vessels.

In some embodiments a partial pressure of hydrogen in the first atmosphere is controlled to prevent hydrogen permeation bubbles from being generated in the molten glass. In certain embodiments a first flange is joined to the first vessel and a second flange is joined to the second vessel, the first and second flanges being coupled to the flexible metallic barrier, and the first flange is electrically isolated from the second flange.

In some processes, the second vessel may be moved relative to the first vessel, and the movement of the second vessel results in an extension or compression of the flexible metallic barrier. To control a temperature of the molten glass conveyed within the first vessel, the first vessel may be heated, such as through the use of external heating elements disposed proximate the first conduits wall, or by flowing an electrical current through the first vessel.

The first atmosphere is separated from a second atmosphere by the first flange, and a hydrogen partial pressure of the second atmosphere may also be controlled. In some embodiments, a third atmosphere may be disposed about at least a portion of the second vessel and the third atmosphere is separated from the second atmosphere. A hydrogen partial pressure of the third atmosphere may also be controlled independently from the first and second atmospheres.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

Figure 1:
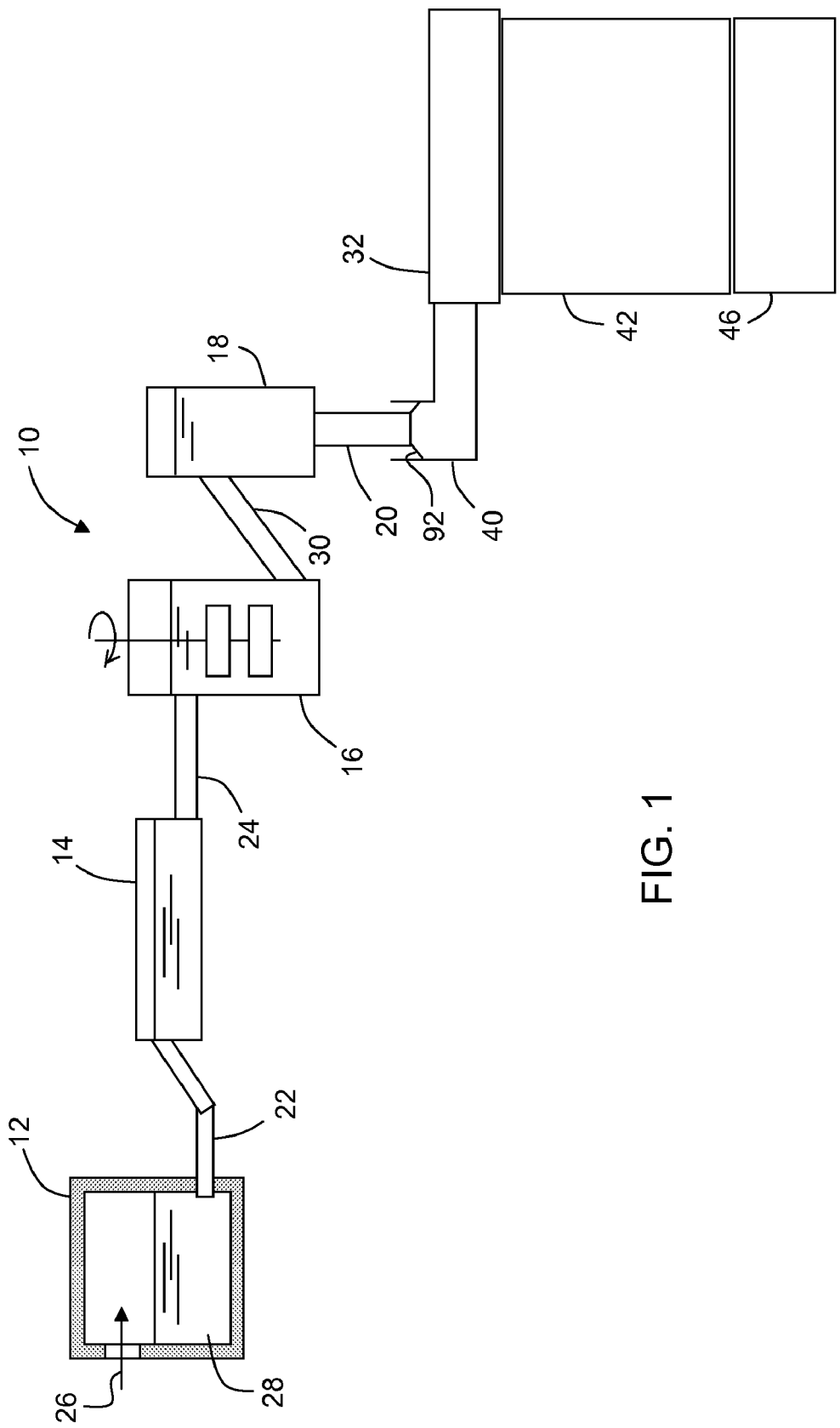
FIG. 1 is a cross sectional elevation view of an exemplary fusion downdraw process according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

In an exemplary fusion-type downdraw process, molten glass is produced in a melting furnace to which a batch material (e.g. various metal oxides or other constituents) is supplied. The molten glass is thereafter conditioned to remove bubbles, and then stirred to homogenize the glass. The molten glass is then supplied via a feed conduit to an inlet of a forming body comprising a channel open at its top formed in an upper surface of the body. The molten glass overflows the walls of the channel and flows down converging outside surfaces of the forming body until the separate flows meet at the line along which the converging surfaces meet (i.e. the "root"). There, the separate flows join, or fuse, to become a single ribbon of glass that flows downward from the forming body. Various rollers (or "rolls") positioned along the edges of the ribbon serve to draw, or pull the ribbon downward and/or apply an outward tensioning force to the ribbon that helps maintain the width of the ribbon. Some rolls may be rotated by motors, whereas other rolls are free-wheeling. Although the melting furnace, or "melter" is typically formed from a refractory ceramic material (e.g. alumina or zircon), much of the downstream system for conveying and treating the molten glass is formed from a high temperature-resistant metal, such as platinum or a platinum alloy (e.g. platinum-rhodium). Finally, the forming body itself is typically also a refractory (e.g. zircon).

Not only are the temperatures of the various components of the glass making system at different temperatures (resulting from the gradual cool down of the molten glass as it flows through portions of the platinum components), but portions of the downstream components are formed of different materials than other portions and have different thermal expansion characteristics. For example, the thermal expansion characteristics of the platinum components are different than the thermal expansion characteristics of the forming body. Because the process of forming glass sheet to stringent dimensional requirements, such as for the manufacture of glass sheets for LCD display applications, relies on a stable forming body, the forming body is isolated from the preceding platinum system so that movement of the platinum system does not influence the position of the forming body.

An exemplary fusion downdraw apparatus 10 is shown in FIG. 1 comprising melter 12, finer 14, stirring vessel 16, bowl 18 and downcomer 20. Melter 12 is joined to finer 14 via melter to finer connecting conduit 22, and finer 14 is joined to stirring vessel 16 via finer to stirring vessel connecting conduit 24. Batch material 26 is placed in melter 12 and heated to produce a viscous molten glass material 28. The molten glass flows from stirring vessel 16 to bowl 18 through connecting conduit 30 and from bowl 18 the molten glass flows vertically through feed conduit, or downcomer, 20.

Figure 2:
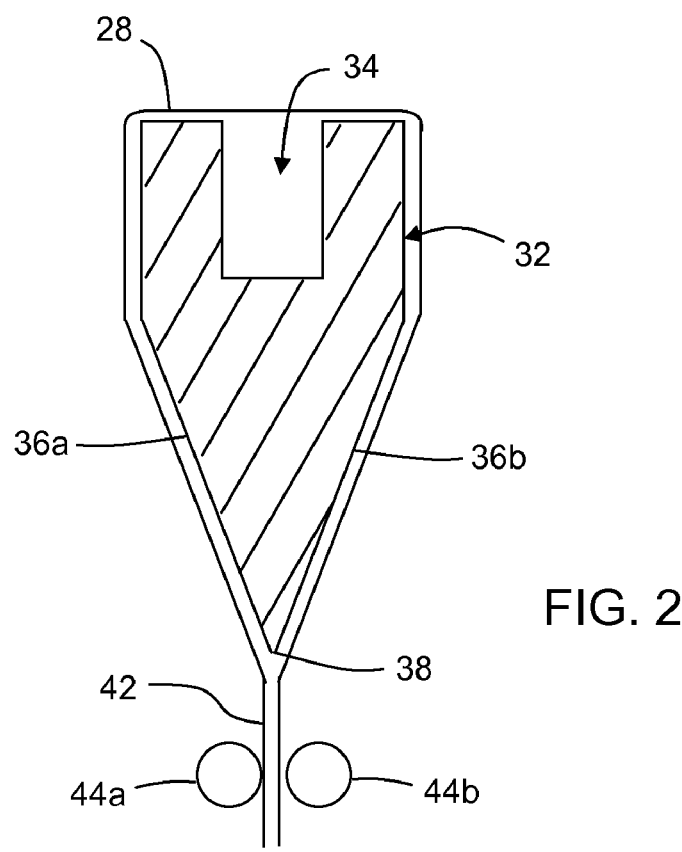
FIG. 2 is a cross sectional view of a forming body comprising the apparatus of FIG. 1.

As best seen in FIG. 2, forming body 32 defines a channel or trough 34 and includes converging forming surfaces 36a and 36b. Converging forming surfaces 36 meet at root 38 that forms a substantially horizontal draw line from which molten glass 28 is drawn. Trough 34 is supplied with molten glass 28 from a platinum or platinum alloy inlet pipe 40 that is coupled to forming body 32. The molten glass overflows the walls of the forming body trough and descends over the outer surfaces of the forming body as separate streams. The separate streams of molten glass flowing over converging forming surfaces 36a and 36b meet at root 38 and form glass ribbon 42. Glass ribbon 42 is drawn from root 38 by opposing edge rollers 44a and 44b positioned below the root, and cools as it descends from the root, transitioning from a viscous molten material to an elastic solid.

When glass ribbon 42 has reached a final thickness and viscosity in an elastic region of the ribbon, the ribbon is separated across its width in the elastic region to provide an independent glass sheet 46. As molten glass continues to be supplied to the forming body, and the ribbon lengthens, additional glass sheets are separated from the ribbon.

The connection between the downcomer and the forming body occurs at a joint between the downcomer 20, rigidly connected to the platinum system upstream of the downcomer, and the forming body inlet pipe 40. To differentiate, the term "platinum system", as used herein, will be construed to mean the platinum (or platinum alloy) components of the glass making apparatus upstream of inlet pipe 40, e.g. platinum-containing components 14, 16, 18, 20, 22 and 24.

Figure 3:
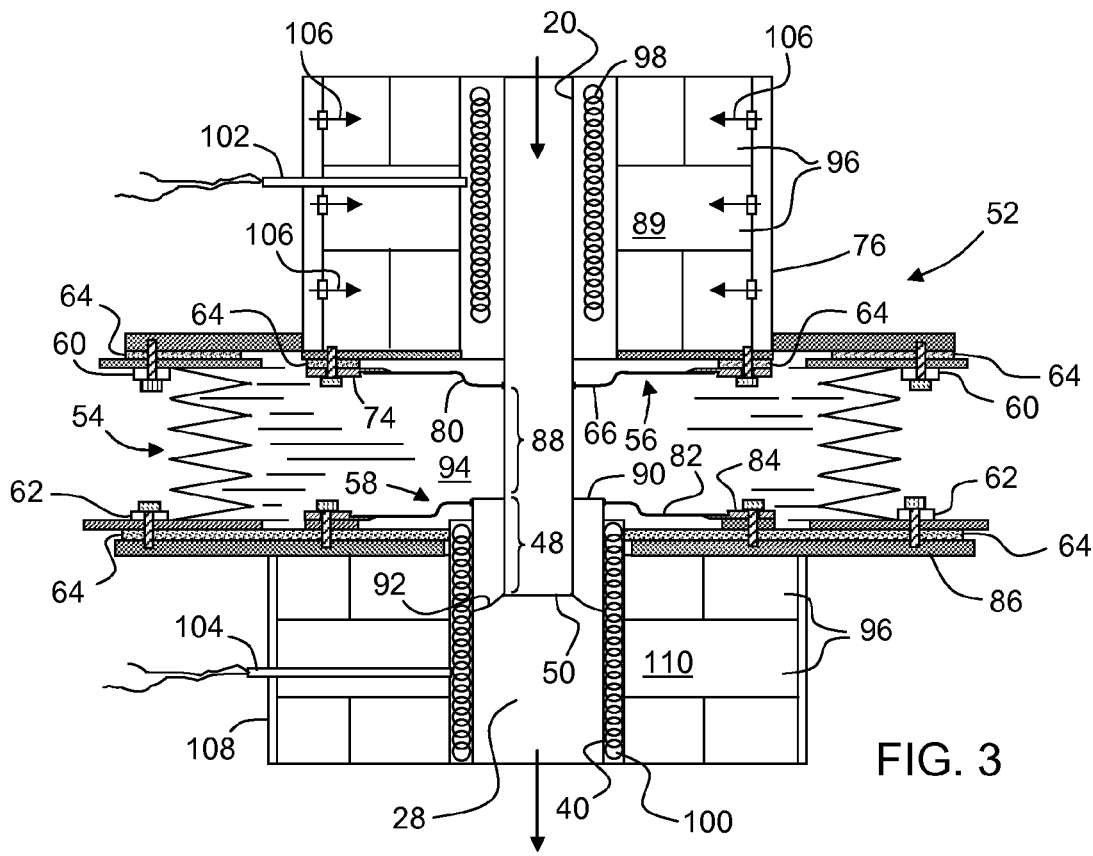
FIG. 3 is a cross sectional view of an exemplary sealing apparatus according to an embodiment of the present invention.

To prevent movement of downcomer 20 from influencing the position of forming body 32, the joint between the downcomer and the forming body inlet pipe is free-floating. That is, downcomer 20 and inlet pipe 40 do not directly touch. Instead, downcomer 20 is inserted a finite distance into the inlet pipe so that a portion 48 of downcomer 20 is positioned within inlet pipe 40. As best shown in FIG. 3, the free tip or distal end 50 of downcomer 20 may be positioned above the average level of molten glass within the inlet, at the average level of the molten glass or below the average level of the molten glass. Thus, if movement of the platinum system occurs, downcomer 20 is free to move within inlet pipe 40 without transferring that movement to the inlet pipe and forming body. Similarly, because intentional movement of the forming body is sometimes necessary to balance the mass flow rate of the molten glass over the external forming surfaces of the forming body, a free-floating joint between the downcomer and the inlet allows the inlet to move (in unison with the forming body) without constraint by the downcomer. This decoupling of the downcomer from the inlet pipe provides for independent movement of the downcomer from the inlet pipe.

In spite of the advantages of having a free-floating joint between the downcomer and inlet pipe, without a gas-tight seal between these two components the free surface of the molten glass within the inlet would be open to the environment (e.g. the ambient atmosphere), thereby exposing the molten glass to contamination. For example, thermally generated drafts that develop in the downcomer-inlet joint area can lead to temperature gradients in the glass that can in turn result in gaseous inclusions in the glass. A seal between the inlet and downcomer should be capable of meeting multiple objectives. The seal should allow for differential movement of the downcomer from the inlet and forming body, the seal components must withstand elevated temperatures, adjustability between seal components must be maintained, thermal gradients in the molten glass conveying tubes should be minimized, the downcomer should be electrically isolated from the inlet and from ground, visual access should be maintained for alignment purposes, and a gas tight separation between the downcomer, inlet tube assemblies, and the general environment should be established.

FIG. 3 depicts an exemplary embodiment of an apparatus 52 for sealing the downcomer-to-inlet joint. The apparatus comprises a bellows 54, downcomer sealing flange 56 and inlet sealing flange 58. The apparatus may also comprise one or more downcomer bellows clamps 60, one or more inlet bellow clamps 62 and electrical insulating material 64 disposed at various positions on or about the sealing apparatus. These and other features that address at least some of the objectives above will be described in more detail below.

Figure 5:
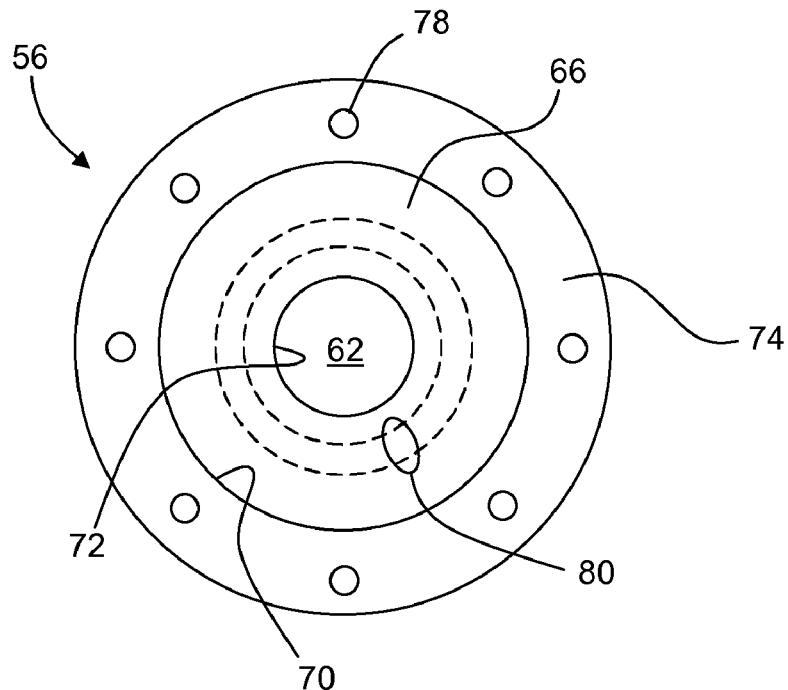
FIG. 5 is a top view of the sealing flange of FIG. 4.
Figure 4:
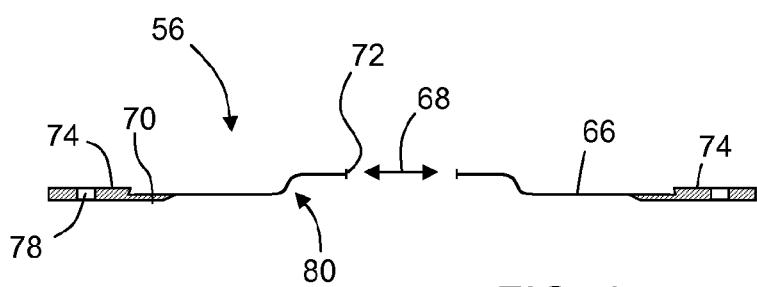
FIG. 4 is a cross sectional view of a sealing flange according to an embodiment of the present invention showing an undulation for accommodating movement of a connected vessel.

FIGS. 4 and 5 depict an exemplary sealing flange that may be used as either or both a downcomer sealing flange or an inlet sealing flange. Although downcomer and inlet sealing flanges 56, 58 may differ in size and shape, their basic materials and construction are generally identical. Consequently, reference will be made to downcomer sealing flange 56, with the understanding that the description is equally applicable to inlet sealing flange 58.

Downcomer sealing flange 56 may be formed from a single material. However, as illustrated in FIG. 4, downcomer sealing flange 56 preferably comprises an inner ring 66 formed from platinum or a platinum alloy (e.g. platinum rhodium). Because inner ring 66 is formed from an expensive metal (i.e. a precious metal), the thickness of the inner ring should be thick enough to perform its sealing function while at the same time sufficiently thin to ensure sufficient flexibility to accommodate movement of the vessels (e.g. pipes) to which they are attached. Inner ring 66 may, for example, have a thickness between about 0.0254 cm and 0.0762 cm. Inner ring 66 further defines a cutout 68 in the inner ring interior, and an outer portion 70. Inner ring 66 may, for example, have an annular shape. Downcomer 20 passes through cutout 68 and is joined to inner ring 66 along inside edge 72 of the ring, such as by welding. Downcomer sealing flange 56 further comprises an outer ring 74 formed from a high temperature-resistant metal, such as a metal comprising chromium, nickel and aluminum. For example, Haynes 214 has been found to be suitable for outer ring 74. However, other materials can be used, provided they are sufficiently resistant to oxidation at the high temperatures experienced by the outer ring (e.g. greater than about 500° C.) for extended periods of time. Inner ring 66 is joined to outer ring 74 along outer portion 70 of inner ring 66, such that outer ring 74 is generally concentric to inner ring 66.

Downcomer sealing flange 56 is then joined to downcomer casing 76 enclosing at least a portion of downcomer 20, such as by bolting through outer ring bolt holes 78. Downcomer casing 76 may be formed, for example, from steel. Electrical insulating material 64 is positioned between downcomer sealing flange 56 and downcomer casing 76 to provide electrical isolation between the downcomer and the downcomer casing, and between the downcomer sealing flange and electrical ground. For example, RS-100 manufactured by Zircar Refractory Composites, Inc. has been found to be a suitable electrical insulator. However, other electrical insulating materials may be used, provided they exhibit suitable high temperature resistance, and high dielectric constant. Bolts that secure the components (e.g. downcomer sealing flange 56) may include, for example, insulating bushings to prevent the connecting bolts from completing an electrical circuit. Insulating material 64 may be placed as necessary to electrically isolate downcomer 20 from downcomer casing 76, inlet pipe 40 and electrical ground.

To accommodate thermal expansion movement between downcomer 20 and downcomer casing 76, inner ring 66 preferably includes a wave or undulation 80 across a cross section of the inner ring that allows movement of the respective components without undue stress on the flange. The undulation illustrated in FIGS. 3 and 4 is generally in the shape of an ogee. However, different types (shapes) of undulations may be employed.

As with downcomer sealing flange 56, inlet sealing flange 58 preferably comprises an inner ring 82 and an outer ring 84. Inner ring 82 is preferably formed from a high temperature resistant metal such as platinum or a platinum alloy (e.g. platinum rhodium). Outer ring 84 may be formed from a less expensive heat-resistant metal with low oxidation potential, such as Haynes 214. Inner ring 82 is joined to an outer periphery of inlet pipe 40, such as by welding, and outer ring 84 is coupled to a portion of an inlet pipe casing, e.g. inlet casing member 86. Inlet sealing flange 58 is electrically isolated (insulated) from inlet casing member 86.

As illustrated in FIG. 3, with downcomer sealing flange 56 joined to downcomer 20 and inlet sealing flange 58 joined to inlet pipe 40, a portion 88 of downcomer 20 extending from the end or mouth 90 of inlet 40, as well as free surface 92 of molten glass 28 within inlet pipe 40, would be left exposed to the ambient atmosphere.

As described above, sealing apparatus 52 further comprises bellows 54 formed from a material capable of withstanding the high temperatures at the downcomer inlet joint area without significant oxidation or other corrosion. For example, bellows 54 can be formed from stainless steel. A first end of bellows 54 is removably attached to downcomer casing 76 via one or more clamps 60 that bolt to downcomer casing 76 and secure the bellows to the downcomer casing. Similarly, the second, opposite end of bellows 54 is coupled to inlet casing member 86 via one or more clamping members 62. Clamping members 62 may be secured via bolts, for example. As described supra, these bolts may include, for example, insulating bushings to prevent the connecting bolts from completing an electrical circuit.

Bellows 54 is preferably installed such that when the glass making system is in operational readiness (e.g. both ends of bellows 54 clamped to their respective downcomer and inlet casings), bellows 54 is in tension (forcefully expanded or stretched). That is, if the bellows is released at either end (securing clamps removed) in this stretched condition, the bellows preferably will contract longitudinally, allowing for inspection of the interior region of the bellows. Visual access to the interior of the bellows can be used to facilitate radial and/or longitudinal positioning of the downcomer within the inlet pipe.

As with downcomer 20 and inlet pipe 40, additional electrical insulating material 64 is positioned such that bellows 54 is electrically insulated from downcomer casing 76, inlet casing member 86 and electrical ground. Thus, bellows 54, downcomer 20, inlet 40, downcomer casing member 76, inlet casing member 86 and electrical ground are all electrically insulated from each other. The positioning of the electrical insulating material 64 will depend of course on the specific design of the sealing apparatus components, and how they are joined.

To prevent hydrogen permeation blisters from forming within the molten glass flowing through downcomer portion 88 between downcomer sealing flange 56 and inlet sealing flange 58, the atmosphere in contact with downcomer portion 88, represented by reference numeral 89, may be controlled. Hydrogen permeation blisters occur when the partial pressure of hydrogen in an external environment (such as the atmosphere within the interior region of the bellows) is lower than the partial pressure of hydrogen in the molten glass flowing through a platinum (or platinum alloy) vessel. The high temperature of the molten glass can cause OH radicals within the molten glass to disassociate, and the hydrogen partial pressure difference across the platinum boundary causes the hydrogen to permeate through the boundary, leaving the oxygen to form bubbles in the molten glass. By controlling the partial pressure of hydrogen in bellows interior region 94, such as by introducing moisture into the bellows region and controlling the dew point, hydrogen permeation blisters can be avoided. For example, water vapor can be introduced into interior region 94 through one or more valves and associated piping (not shown), to adjust the dew point of the atmosphere within the interior region. The dew point of the interior atmosphere can be controlled to prevent the formation of so-called hydrogen permeation blisters. Of course other ways of controlling the hydrogen partial pressure in the bellows interior region 94 can be used, such as introducing hydrogen gas, methane, or other hydrogen sources. However, many hydrogen compounds present an explosion risk, and water vapor has been shown to provide a safe alternative.

In certain embodiments, a thermal insulating material (not shown) can be placed within the interior region of the bellows to prevent heat loss through the bellows. For example, a refractory (e.g. ceramic) blanket (not shown) can be placed within the bellows interior. Such refractory, thermally insulating blankets are commercially available.

As with most of glass making apparatus 10, downcomer 20 and inlet pipe 40 are thermally insulated by insulating refractory material. For example, this insulating refractory material may take the form of refractory blocks 96. In other embodiments the refractory material surrounding the downcomer and inlet pipe may be a castable refractory material. Additionally, downcomer 20 and inlet 40 may be heating members 98, 100 respectively. Thermocouples 102 and 104 may be used to monitor the temperature of the downcomer and inlet pipe, respectively. A feedback system may be used to link the temperature derived electrical signal from the thermocouples to a temperature regulating controller that regulates the electrical power to the heating members.

In some embodiments, an atmosphere within downcomer casing 76 may be controlled in a manner similar to the interior region of bellows 54. That is, the partial pressure of hydrogen within the casing may be controlled via the introduction of a hydrogen containing constituent, either directly, such as with a hydrogen containing gas, or indirectly, via water vapor, as indicated by arrows 106. In addition, inlet pipe 40, and refractory blocks 96 surrounding the inlet pipe, may be surrounded by a second, inlet casing 108. Because refractory blocks 96 are typically porous, a third atmosphere within enclosure 108, represented by reference numeral may be controlled similar to the first and second atmospheres in the downcomer region and within the region surrounded by bellows 54. Thus, a partial pressure of hydrogen in the third atmosphere may be controlled independently from the first and second atmospheres 89 and 94.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for sealing a gap between vessels conveying molten glass in a fusion downdraw process comprising:
    a conditioning section for homogenizing a glass melt;
    a first conduit having an open distal end and a proximal end connected to the conditioning section to allow molten glass to flow therethrough;
    a forming body defining an inlet, a channel, and converging forming surfaces;
    a second conduit having an open distal end and a proximal end connected to the inlet of the forming body to allow molten glass to flow into said forming body, wherein at least a first portion of the first conduit adjacent the first conduit distal end is disposed within the second conduit without contacting the second conduit, there being a gap between the first conduit and the second conduit that exposes a free surface of the molten glass in the second conduit to a first atmosphere;
    a flexible barrier, the flexible barrier disposed about a second portion of the first conduit extending from the second conduit open distal end;
    a first sealing flange joined to the first conduit;
    a second sealing flange joined to the second conduit; and
    wherein the flexible barrier, the first sealing flange and second sealing flange comprise a gas-tight seal separating the first atmosphere from an ambient atmosphere.

2. The apparatus according to claim 1, wherein the flexible barrier is a bellows.

3. The apparatus according to claim 1, wherein the first and second flanges each comprise an inner ring and an outer ring joined to the respective inner ring.

4. The apparatus according to claim 3, wherein the inner ring of both the first conduit and the second conduit flanges comprises platinum.

5. The apparatus according to claim 1, wherein the first and second conduits comprise platinum.

6. The apparatus according to claim 1, wherein the flexible barrier is electrically isolated from the first and second conduits.

7. The apparatus according to claim 1, wherein the inner ring of the first flange is non-planar.

8. The apparatus according to claim 1, wherein the first atmosphere is different than the second atmosphere.

9. The apparatus according to claim 1, wherein a position of the second conduit can be varied without varying a position of the first conduit.

10. The apparatus according to claim 1, wherein the flexible barrier comprises nickel or chromium.

11. The apparatus according to claim 1, wherein the flexible barrier is non-magnetic.

12. The apparatus according to claim 1, wherein the first or second conduit is electrically isolated from electrical ground.

* * * * *